United States Patent
Bienert et al.

[15] 3,672,443
[45] June 27, 1972

[54] THERMAL CONTROL AND POWER FLATTENING FOR RADIOISOTOPIC THERMODYNAMIC POWER SYSTEM

[72] Inventors: Walter B. Bienert; William J. Levedahl; Alan J. Streb, all of Baltimore, Md.

[73] Assignee: Teledyne, Inc., Los Angeles, Calif.

[22] Filed: Jan. 28, 1969

[21] Appl. No.: 797,368

Related U.S. Application Data

[63] Continuation of Ser. No. 506,206, Nov. 3, 1965.

[52] U.S. Cl. .................................165/32, 165/105, 136/202
[51] Int. Cl. .....................................F28d 15/00, G05d 23/00
[58] Field of Search ..........................165/105, 32; 136/202

[56] References Cited

UNITED STATES PATENTS

| | | | |
|---|---|---|---|
| 2,581,347 | 1/1952 | Backstrom | 165/105 X |
| 2,924,635 | 2/1960 | Narbut | 165/105 X |
| 3,229,759 | 1/1966 | Grover | 165/105 |

OTHER PUBLICATIONS

Cotter, T. P. Theory Of Heat Pipes, Los Alamos Scientific Laboratory, Los Alamos, New Mexico, 3/26/65, pp. 1 and 33, LA- 3246- MS Primary Examiner—Albert W. Davis, Jr.
Attorney—Fleit, Gipple & Jacobson

[57] ABSTRACT

A thermal control device utilizing the heat pipe principle. Heat receiving and heat rejecting surfaces are spaced from each other along the length of the heat pipe. In a preferred form, a radioisotope fuel capsule is in thermal conducting relationship with the heat receiving surface and a noncondensible gas is mixed with the working fluid of the heat pipe. A noncondensible gas automatically expands as the threshold temperature of the system drops to block off more of the heat rejecting surface. In other alternate preferred embodiments, a nonvaporizable liquid is utilized in lieu of a noncondensible gas to reduce the area of the heat receiving surface as the threshold temperature of the system drops or a second material is mixed with the working fluid which changes to a solid phase to block the flow of the working fluid between the heat rejecting and heat receiving surfaces as the threshold temperature of the system drops.

1 Claim, 2 Drawing Figures

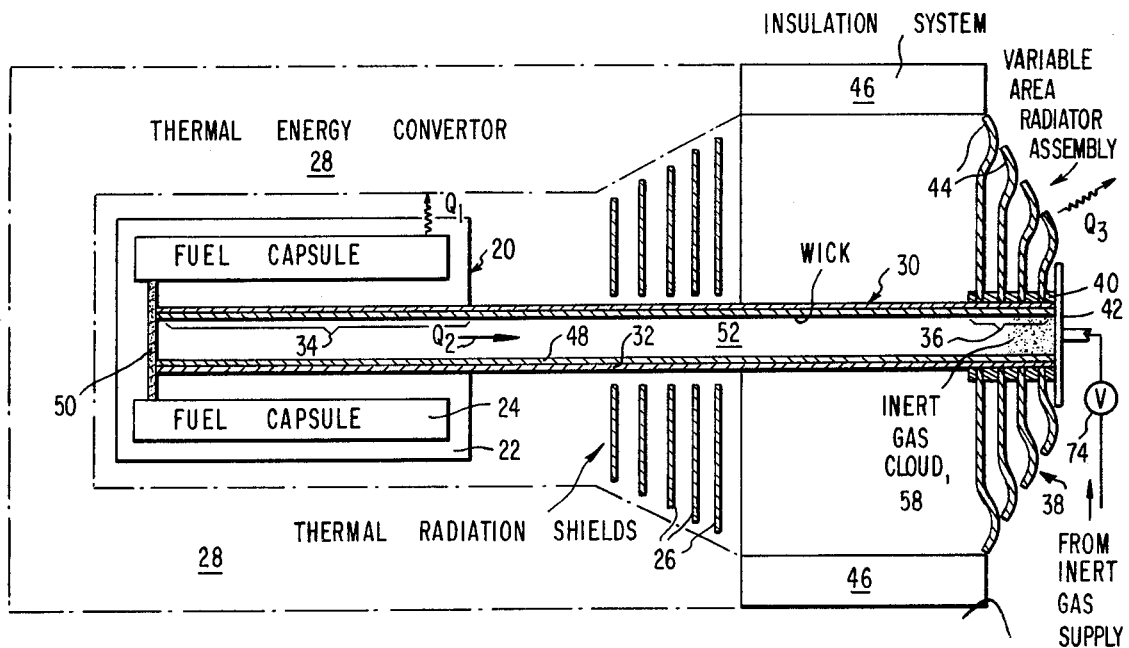
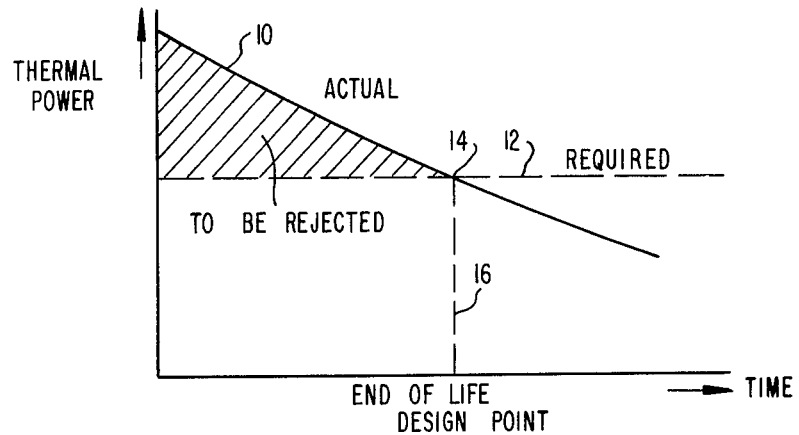
INVENTORS
WALTER B. BIENERT
WILLIAM J. LEVEDAHL
ALAN J. STREB
BY Sughrue, Rothwell, Mion,
    Zinn & Macpeak
                ATTORNEYS

THERMAL CONTROL AND POWER FLATTENING FOR RADIOISOTOPIC THERMODYNAMIC POWER SYSTEM

CROSS-REFERENCE

This is a continuation of application Ser. No. 506,206, filed Nov. 3, 1965.

This invention relates to radioisotope-powered generators and the like, and more particularly, to completely passive means for controlling the amount of heat rejected directly from the heat source of said generators such that the temperature of the heat source and the quantity of heat passing through the energy conversion system are controlled.

Radioisotope, thermodynamic systems are much in vogue as a means for providing a ready source of energy for spacial applications of long duration. The radioisotopic fuel source is quite compatible with conventional thermoelectric or thermionic energy converters, for instance, which may be positioned between the radioisotopic fuel capsule and a heat sink. Thus, the released thermal energy passes directly to the conversion means in a relatively efficient manner.

Inherently, in radioisotopic, thermal energy sources, the thermal power available decreases slowly over the system life. There is initially an overabundance of thermal energy which must be rejected, with the excess thermal energy decreasing or diminishing and approaching zero at the end of system life. Since the thermal energy required by the converter means may remain constant over the life of the system, it is desirable to reject this unwanted excess thermal energy at a variably decreasing rate.

In the general heat transfer field, there have evolved isothermal heat transfer means which transport heat from one point to another with little temperature difference. One type of nearly isothermal heat transfer device is conventionally known as a "heat pipe." It fundamentally consists of a tube or other container closed at both ends containing a single fluid in two phases (liquid and gas) which are in equilibrium. The liquid is contained for the most part in a capillary structure lining the inner surface of the tube wall while the vapor is contained largely in an adjacent void space. Heat is added at a heat receiving surface and causes evaporation of fluid from adjacent areas of the interior capillary structure. Simultaneously, the inverse process is established at areas of the tube from which heat is being removed. The vapor phase is condensed on the capillary structure adjacent to the heat rejection surface. A difference in capillary forces between the condensing and evaporating regions causes the transport of liquid from the condensing to the evaporating regions. A small difference in vapor pressures between the evaporating and condensing regions causes transport of vapor in the opposite direction. Heat is thereby transported between the two heat transfer surfaces with essentially no temperature difference.

The amount of heat which is transferred between the ends of the heat pipe is determined by the rate of movement of the working fluid, which moves as a gas through the void and as a liquid, by capillary action, through the capillary lining.

It is, therefore, a primary object of this invention to provide an improved radioisotope, thermodynamic system which incorporates a heat pipe for rejecting excess thermal energy in which the rate of excess heat rejection may be readily varied over the life of the radioisotopic fuel source.

It is a further object of this invention to provide an improved radioisotopic, thermodynamic system which employs completely passive means for variably rejecting the waste thermal energy of the radioisotopic fuel source.

It is a further object if this invention to provide an isothermal heat transfer means in the form of a heat pipe for use in conducting rejected heat from a radioisotopic, thermodynamic system which incorporates a noncondensing gas obtained directly from the alpha decay of the radionuclide.

It is a further object of this invention to provide an improved heat pipe for isothermal heat transfer in which the rate of heat transfer may be readily varied by completely passive means.

It is a further object of this invention to provide an improved heat pipe providing isothermal heat transfer in which the heat pipe may be used either as a variable heat flow device or as a thermal on-off switch.

The foregoing and other objects, features and advantages of the invention will be apparent from the following more particular description of preferred embodiments of the invention, as illustrated in the accompanying drawing.

FIG. 1 is a schematic view, partially in section, of a radioisotope, thermodynamic system of the present invention incorporating a centrally disposed, improved heat pipe of the present invention.

FIG. 2 is a graph of the thermal power output of a radioisotopic heat source against time for a conventional radioisotopic, thermodynamic system.

In general, the present invention relates to a method and apparatus for variably controlling the rate of isothermal heat transfer through a heat pipe by completely passive means carried by the heat pipe itself. The heat pipe comprises an enclosure having spaced external heat input and heat rejecting surfaces and a working fluid carried therein having liquid and gaseous phases in equilibrium. The steps of achieving thermal energy transfer control consist of applying heat to the input surface to vaporize the liquid phase at the adjacent interior capillary structure wherein the vaporized working fluid migrates toward the interior capillary structure adjacent to the external heat rejecting surface and condenses thereon to effect isothermal heat transfer therebetween and variably controlling the rate of movement of one of the phases of the working fluid between the surfaces.

In a preferred form, the heat pipe includes a wick, lining the tube wall continuously, which acts to move the liquid phase by capillary action, while the gaseous phase is contained in a void channel parallel to the wick. Variable control is achieved in one form by varying the amount of a noncondensable gas within the enclosure to prevent the working fluid in the gaseous phase from coming into heat transfer relation with the heat rejecting surface. In a preferred form, the amount of noncondensable gas remains constant and the rate of heat transfer between the working fluid and the heat rejecting surface of the heat pipe decreases with decreasing vapor temperature. In yet another form of the invention, control is achieved by varying the amount of a nonvaporizing liquid within the heat pipe which acts to prevent the vaporizable working fluid, in liquid form, from coming into heat transfer relation with the heat input surface. In yet a fourth embodiment, control is achieved by adding a second material within the heat pipe with the working fluid in liquid phase being miscible or soluble therein, wherein, reducing the threshold value of the mixture to the point where the second material changes to a solid phase acts to block the flow of working fluid between the heat transfer surfaces of the heat pipe.

The heat pipe may advantageously be located centrally to a radioisotopic fuel capsule with the heat input surface of the heat pipe in heat transfer relation to the fuel capsule.

Referring to the drawing, FIG. 2 discloses the typical thermal power plot against time for a radioisotopic heat source. It is noted that the curve 10 slopes gradually downwardly and to the right, thus the fuel source provides excess thermal energy at the beginning of system life which gradually diminishes, approaching zero at the end of system life. The required thermal energy is given by the dotted line 12 which extends horizontally. The intersection of the two lines 10 and 12, indicated at 14, and the vertical extension 16 thereof represents the end of life design point, wherein the thermal energy source is no longer sufficient to provide the required thermal energy to the conversion means, and the power source must be replaced. Thus, throughout the complete life of the system, there is a decreasing amount of excess thermal energy which must be rejected to provide the desired thermal gradient from the fuel capsule outward to the thermal energy converter means of the thermodynamic system shown in FIG. 1.

Turning to FIG. 1, there is shown an otherwise conventional radioisotope-powered generator system incorporating a centrally located fuel assembly 20 including a fuel block heat sink 22 and a hollow cylindrical fuel capsule or radioisotopic fuel source 24. Thermal radiation shields, indicated at 26, are provided for the system, as well as appropriate cylindrical thermal insulation means 46. A thermal energy converter 28 which may consist of the thermoelectric or thermoionic subassembly is positioned concentric of the fuel source subassembly 20 and surrounds the same. The converter is in a position to receive thermal energy released radially from the fuel capsule, as indicated by the radial arrow $Q_1$. The particular thermodynamic conversion means and fuel assembly form no part of the present invention and may, for instance, comprise a radioisotopic powered thermoelectric converter of the type set forth in pending application Ser. No. 474,547, entitled "Low Cost Radioisotope Thermoelectric Generator," filed July 26, 1965, and assigned to the common assignee, now U.S. Pat. No. 3,352,449, granted Nov. 14, 1967.

The present invention is directed to an improved isothermal heat transfer device in the form of a heat pipe, indicated generally at 30, which is positioned centrally of both the radioisotopic fuel source subassembly 20 and the concentrically positioned thermal energy converter 28. The heat pipe 30 consists of an elongated tube 32 formed of metal or other material, closed at both ends to form a completely sealed enclosure. The inner end of the tube, indicated at 34, thus forms an annular heat input surface for the heat pipe, while the outer end 36 acts as an annular heat dissipating or heat rejecting end. In conjunction therewith, the outer end 36 of the heat pipe includes a variable area radiator assembly, indicated generally at 38, which comprises a tubular section 40 having an outer flat plate 42 and a number of radially extending heat rejecting fins 44 having increased radial dimensions from the outer end, inwardly, toward the fuel capsule. The inner diameter of the tubular section 40 is in the order of the outer diameter of tube 32 and the variable area radiator assembly 38 is merely slid over the end 36 with the two cylindrical members being in good thermal contact for maximum heat transfer. The closed tube 32 contains a single fluid having liquid and gaseous phases in equilibrium. The liquid phase is contained, for the most part, in a wick lining 48 or other porous mass, which is cylindrical in form and is carried adjacent the tube wall. The gaseous phase is contained in the centrally located void 52. The fuel capsule 24 releases thermal energy, which moves both radially in the direction $Q_1$, toward the thermal energy converter 28, and axially as indicated by the straight arrow $Q_2$ after passing through the heat input surface area 34. The heat added to the end 34 of the tube causes evaporation of the liquid phase in the wick at that end. The gaseous phase migrates from left to right or from the heat input surface 34 of the tube through the void toward the variable area radiator assembly 38 in contact with heat rejection surface 36. The fins 44 act to cool the heat rejection surface of the heat pipe condensing the gaseous phase. The liquid migrates toward the heated end by capillary action through the wick 48. A disturbance in the vapor pressure equilibrium is thereby established causing a flow of vapor from the heated end to the cooled end. Heat is thereby transferred between the two ends of the pipe with essentially no temperature difference.

In the above description, the amount of heat transfer provided by the heat pipe to effect release of excess thermal energy through radiation from the surfaces of the fin radiator is dependent upon several factors, namely, the amount of thermal energy released by the fuel capsule to the heat pipe 30 and threshold temperature thereof, the rate of thermal dissipation by the variable radiator assembly, the flow rate of the working fluid carried by the heat pipe and the characteristic of the working fluid, such as its vapor pressure, etc. Obviously, the rate of heat transfer may be increased by increasing the temperature at the heat input surface 34, the size of the heat pipe, the flow rate of working fluid carried thereby, and the physical size of the radiator assembly.

The present invention is particularly directed to the provision of completely passive means for controlling the rate of flow of the working fluid for a heat pipe in either gaseous or liquid form between the heat input surface of the heat pipe and the heat rejection surface spaced at the opposite end thereof.

In a preferred embodiment, to provide a variable impedance function, a noncondensable gas is positioned within the closed heat pipe which acts to reduce the effectiveness of the radiator assembly to dissipate the thermal energy received by the heat input surfaces at the left end of the heat pipe 30. The noncondensable gas may comprise any inert gas, such as helium or argon, or alternatively, oxygen and nitrogen may be used provided they are compatible with the working fluid and structure. The working fluid itself should preferably have a vapor pressure greater than 0.1 atmosphere at the operating temperature determined by the particular fuel capsule or other thermal energy source associated with the heat input end of the heat pipe or by the thermal-to-electrical energy conversion system. For instance, in the device shown in FIG. 2 which employs a radioisotopic heat source, the temperature surrounding the heat pipe is in the order of 820° C. and an acceptable working fluid comprises sodium having a vapor pressure of 0.5 atmosphere at this temperature. With sodium as the working fluid, the noncondensable gas which achieves the variable impedance function may consist of any one of the inert gases, such as helium or argon. Obviously, the employment of oxygen as the noncondensable gas in a system employing sodium as the working fluid would result in undesirable chemical reaction.

A complete spectrum of working fluids is available depending upon the temperature of the heat source. For instance, water at a temperature of approximately 100° C. would provide the desired isothermal heat transfer function. Silver at 2,000° C., lithium at 1,000° C., liquid ammonia at 0° C., and oxygen at −200° C. may provide suitable working fluids depending upon particular application requirements.

In employing a noncondensable gas as the moderating means, the gaseous phase tends to drag the inert gas molecules of the noncondensable gas to the heat rejection end of the pipe whereby the noncondensable gases collect and are compressed as a cloud 58, the noncondensable gas cloud being at a variable axial distance from the heat rejecting end of pipe 30 depending upon the vapor pressure of the working liquid. The vapor pressure of the working liquid increases exponentially with temperature to thereby have a relatively large affect upon the volume of inert gas depending upon the amount of heat moving into the heat pipe. The addition of a noncondensable gas to the condensable vapor substantially impedes the flow of heat, apparently due to the fact that the flow of vapor is inhibited particularly near the cooled end where the nonparticipant gas 58 is forced to collect. With the vapor pressure rising exponentially with increased temperature, the nonparticipant gas 58 is forced to occupy a very small zone at the extreme end of the pipe, thereby permitting near normal function of the system. The denser the inert gas cloud, the greater the number of fins 44 in thermal transfer relation to the gaseous phase working fluid. Heat is transferred to the fin elements of the radiator by conduction from the heat pipe and eventually radiated to space from the exposed portions of the fins as indicated by arrow $Q_3$. At higher temperatures, the inert gas cloud which is trapped at the radiator end is compressed, and a large fraction of the radiator becomes active. At lower temperatures the cloud is less dense and larger in size and some of the radiator elements nearest the end are therefore rendered inert. In this way, the heat dumped to and from the variable radiator is modulated and used to reject excess power from the radioisotopic heat source.

When viewing FIG. 1, it is apparent that a larger number of the fins 44 become active to thermally dissipate the excess heat at the beginning of system life and gradually as the available thermal power is reduced, the lower temperature is reflected by a larger inert gas cloud and a decrease in active fin surface area.

While the use of a noncondensable gas constitutes a preferred method of varying the rate of heat transfer between the heat input surface and the heat rejecting surface of the heat pipe, alternative modes of operation are available. The reflux of liquid in the wick 48 may be impeded by the addition of a fluid of low vapor pressure, thereby providing the converse to the operation discussed above. In this case, the low vapor pressure liquid blocks the flow of participating liquid by capillary action from the heat rejecting end of the heat pipe to the heat input end. With a decrease in available vaporizable liquid, the heat transfer between the spaced surfaces of the heat pipe is decreased regardless of the available thermal energy.

Alternatively, rather than a retarding or variable impedance action, positive blocking in an on-off fashion may be effected to provide a highly accurate thermal switch. This is achieved by adding a carrier material to the working fluid which will freeze in the wick 48 below a certain threshold value, and in the liquid phase of which the participating fluid is miscible or soluble. In this case, as long as the temperature of the system is above the threshold value, the participating fluid moves in the carrier material by capillary action from the condensing end to the evaporating end of the heat pipe. However, when the temperature decreases below the threshold value, the added carrier material will solidify completely, stopping the flow of the added material and the participating fluid carried thereby.

Where the improved heat pipe is to be used in conjunction with a radioisotopic fuel source, it may be desirable to permit the helium produced in the alpha decay of the radionuclide to be vented directly to the heat pipe, thereby allowing the helium to act as the noncondensable gas phase contaminating factor. In order to show this schematically, there is provided in FIG. 1 a material 50 separating the radioisotopic fuel from the working fluid in the heat pipe which is permeable to small, mobile atoms, such as helium, but impermeable to the larger atoms or molecules of the working fluid, thereby allowing the helium produced by the alpha decay to pass directly to the heat pipe. This is merely one example of a means of achieving the desired passage of generated helium from the fuel capsule to the heat pipe. It is noted that in such systems the volume of helium produced in the alpha decay varies inversely with the age of the fuel. However, since the excess thermal energy decreases with age also, the volume of helium available is in proportion to the need. A further pipe and valve means is indicated at 74 which may be coupled to the heat pipe adjacent the variable area radiator assembly 38 to allow both the introduction of the working fluid and the noncondensable gas in varying amounts as needed.

The relationship between the several embodiments of the invention may perhaps be best seen by reference to the following table which is believed to be self-explanatory.

Noncondensable Gases:

| Working Fluid | Noncondensable Gas |
|---|---|
| ammonia | Hydrogen, oxygen, nitrogen and all noble gases |
| water | |
| liquid metals | noble gases only |

Nonevaporating Liquids:

The use of nonevaporating liquids or liquids which solidify is most feasible if the working fluid itself is a liquid metal, for example, cesium, mercury, sodium, lithium or silver. The selection of the added liquids depends on the working fluid. Examples:

| Working fluid | Nonevaporating liquid | Liquid which solidifies |
|---|---|---|
| sodium | lithium, thallium, gallium, tin, lead, mercury | silver |
| silver | gold, platinum | platinum |

While the invention has particular applicability to a radioisotopic, thermodynamic device for spacial applications where there is an absence of gravity, the improved heat pipe incorporating the variable heat dissipation rate has general application to terrestrial devices in which the liquid phase of the working fluid would be susceptible to gravitational factors. If the unit were used in a terrestrial application, the effect of gravity would be either to impede or assist the movement of the working fluid within the heat pipe. In some applications, the capillary action means could be eliminated with gravity acting to return the condensable gas to the heat receiving surface of the heat pipe.

From the above, it is apparent that the improved heat pipe for the present invention is of intrinsic simplicity, has no moving parts and may reject heat under a range of excessive heat flux to maintain constant thermal power to the energy conversion system throughout the life of a radioisotopic powered thermodynamic device. While the improved heat pipe of the present invention has particular applicability to radioisotopic, thermodynamic systems, it has wide use in all isothermal heat transfer areas.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A completely passive, substantially isothermal heat transfer system comprising: a heat receiving surface; a heat rejecting surface; an enclosure connecting said surfaces; means for insulating said enclosure and said heat receiving surface from ambient while exposing said heat rejecting surface thereto; a working fluid including a mass of non-condensible gas carried within said enclosure having liquid and gaseous phases in equilibrium, said fluid tending to vaporize when in contact with said heat receiving surface and to condense when in contact with said heat rejecting surface whereby heat is transported from said heat receiving surface to said heat rejecting surface by said working fluid; means for varying the mass rate of flow of one phase of said working fluid between surfaces as a function of threshold temperature of said system, capillary means for returning said condensed working fluid from the heat rejecting surface to the heat receiving surface, and a radioisotopic fuel capsule thermally coupled to said heat receiving surface and means to pass helium into the enclosure so that said mass of noncondensible gas comprises helium produced in the alpha decay of said radioisotopic fuel.

* * * * *

UNITED STATES PATENT OFFICE
CERTIFICATE OF CORRECTION

Patent No. 3,672,443          Dated June 27, 1972

Inventor(s) Walter B. Bienert; William J. Levedahl; Alan J. Streb

It is certified that error appears in the above-identified patent and that said Letters Patent are hereby corrected as shown below:

Column 3, line 19, delete "3,352,449, granted Nov. 14, 1967" and insert --3,615,869, granted Oct. 26, 1971--.

Signed and sealed this 12th day of December 1972.

(SEAL)
Attest:

EDWARD M. FLETCHER, JR.                ROBERT GOTTSCHALK
Attesting Officer                      Commissioner of Patents